United States Patent
Moore et al.

(10) Patent No.: US 10,254,153 B2
(45) Date of Patent: Apr. 9, 2019

(54) WEIGHT SCALE AND CORRESPONDING SYSTEMS AND METHODS FOR PREVENTING ADVANCEMENT OF CONGESTIVE HEART FAILURE

(71) Applicant: Medline Industries, Inc., Mundelein, IL (US)

(72) Inventors: Martie Moore, Long Grove, IL (US); Derek Roberts, Chicago, IL (US)

(73) Assignee: Medline Industries, Inc., Northfield, IL (US)

( * ) Notice: Subject to any disclaimer, the term of this patent is extended or adjusted under 35 U.S.C. 154(b) by 210 days.

(21) Appl. No.: 15/235,962

(22) Filed: Aug. 12, 2016

(65) Prior Publication Data

US 2018/0045558 A1    Feb. 15, 2018

(51) Int. Cl.
  *G01G 19/44*  (2006.01)
  *G01G 19/50*  (2006.01)
  *G01G 23/37*  (2006.01)

(52) U.S. Cl.
  CPC ............ *G01G 19/50* (2013.01); *G01G 19/44* (2013.01); *G01G 23/3721* (2013.01)

(58) Field of Classification Search
  CPC ........ G01G 19/44; G01G 19/50; G01G 21/28; G01G 23/3728
  See application file for complete search history.

(56) References Cited

U.S. PATENT DOCUMENTS

| | | | | |
|---|---|---|---|---|
| 3,655,003 A | * | 4/1972 | Yamajima | G01G 19/50 177/173 |
| 4,366,873 A | * | 1/1983 | Levy | G01G 19/44 177/25.19 |
| 4,423,792 A | * | 1/1984 | Cowan | G01G 19/62 177/1 |
| 4,576,244 A | | 3/1986 | Zeigner et al. | |
| 6,038,465 A | * | 3/2000 | Melton, Jr. | A61B 5/1171 600/407 |
| 6,532,385 B2 | * | 3/2003 | Serizawa | A61B 5/0537 600/547 |

(Continued)

OTHER PUBLICATIONS

Ozeri ZB21 WeightMaster 400lbs; Digital Bath Scale with BMI and Weight Change Detection; As shown on Amazon.com; Viewed Jun. 28, 2016.

*Primary Examiner* — Natalie Huls
(74) *Attorney, Agent, or Firm* — Philip H. Burrus, IV

(57) ABSTRACT

A weight scale (100) for assisting with management of congestive heart failure and other ailments includes a housing (101) that can define a substantially flat planar surface (102). A weight measurement device (202) measures a weight of a user. A control circuit (201) stores in a memory (203) a first predefined weight threshold (205) and a second predefined weight threshold (206). The scale includes light sources (107,108,109) operable with the control circuit to selectively present one of three color-coded indications. When the weight is between the below the first predefined weight threshold, the light sources present a first color indication. When the weight is between the first predefined weight threshold and the second predefined weight threshold, the light sources present a second color indication. When the weight is above the second predefined weight threshold, the light sources present a third color indication.

23 Claims, 10 Drawing Sheets

(56) References Cited

U.S. PATENT DOCUMENTS

| | | | |
|---|---|---|---|
| 6,989,494 B2* | 1/2006 | Yagioka | G01G 19/44 |
| | | | 177/25.13 |
| 7,304,252 B1* | 12/2007 | Hunt | G01G 19/4146 |
| | | | 128/921 |
| 8,048,000 B2 | 11/2011 | Furlan | |
| 8,475,367 B1* | 7/2013 | Yuen | G06F 19/3418 |
| | | | 600/300 |
| 9,909,917 B2* | 3/2018 | Sharma | G01G 19/50 |
| 2003/0208110 A1 | 11/2003 | Mault et al. | |
| 2005/0150696 A1 | 7/2005 | Zhou | |
| 2005/0194192 A1 | 9/2005 | Kriger | |
| 2006/0005041 A1* | 1/2006 | Lazeroms | A61B 5/1171 |
| | | | 713/186 |
| 2007/0270707 A1* | 11/2007 | Belalcazar | A61B 5/0537 |
| | | | 600/547 |
| 2009/0178858 A1* | 7/2009 | Daniels | G01G 19/4146 |
| | | | 177/25.19 |
| 2011/0196617 A1* | 8/2011 | Petrucelli | A61B 5/022 |
| | | | 702/19 |
| 2011/0221605 A1 | 9/2011 | Niemann et al. | |
| 2012/0111645 A1* | 5/2012 | Lindner | G01G 19/50 |
| | | | 177/177 |
| 2014/0378860 A1* | 12/2014 | Nakamura | A61B 5/0537 |
| | | | 600/547 |
| 2015/0080722 A1 | 3/2015 | Furlan | |
| 2016/0015276 A1* | 1/2016 | Strauss | A61B 5/0537 |
| | | | 600/301 |
| 2016/0129260 A1 | 5/2016 | Mann et al. | |
| 2016/0299001 A1* | 10/2016 | Petrucelli | A61B 5/0537 |

* cited by examiner

WEIGHT SCALE AND CORRESPONDING SYSTEMS AND METHODS FOR PREVENTING ADVANCEMENT OF CONGESTIVE HEART FAILURE

BACKGROUND

Technical Field

This disclosure relates generally to electronic devices, and more particularly to electronic weight measurement devices.

Background Art

Congestive heart failure is a costly chronic disease. When a patient is diagnosed with congestive heart failure, subsequent condition management practices require daily patient self-monitoring and self-administration of prescribed therapies for maintaining homeostasis. Where properly performed, the self-administration of therapies and medications can prevent deteriorations and complications stemming from the diagnosed condition.

Unfortunately, it can be difficult for the layman to know whether the therapies and/or medications are being effectively implemented. A patient without a medical degree may believe that they are adequately self-monitoring and self-administering prescribed therapies, only to find out later that they were not. When this occurs, significant complications can occur, including death.

It would be advantageous to have an improved electronic device that allows laypeople to know whether they are properly self-monitoring and self-administering prescribed therapies to maintain homeostasis when suffering from congestive heart failure.

Figure 1:
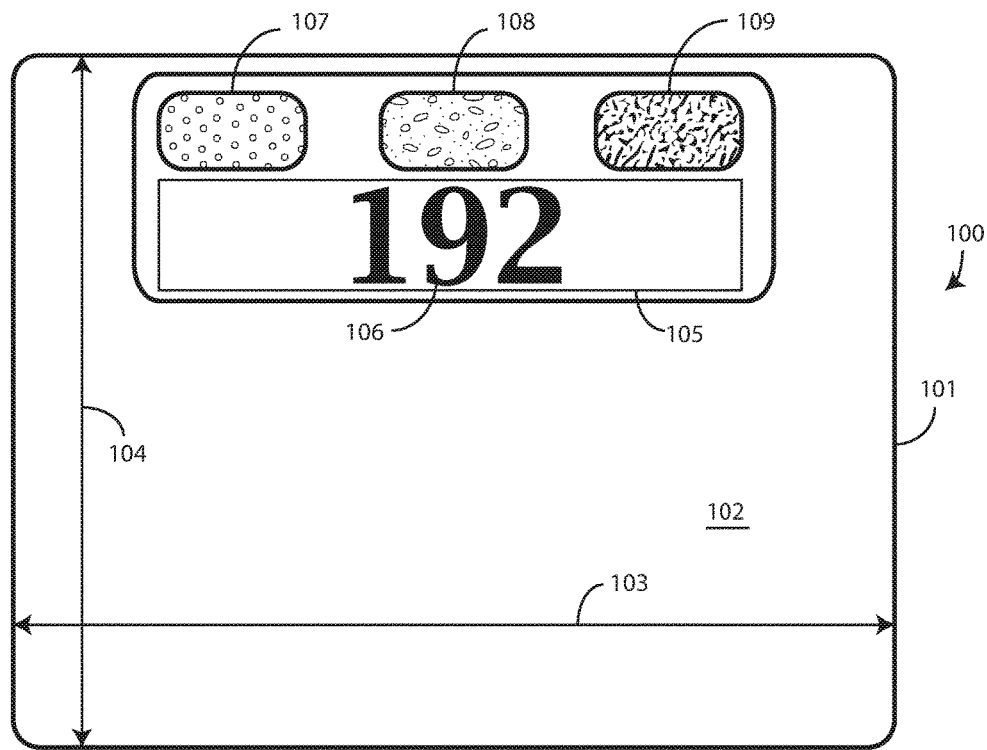
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing indications of proper self-monitoring of a congestive heart failure condition. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the control circuit to implement, in conjunction with certain non-processor circuits, some, most, or all of the functions of monitoring of congestive heart failure conditions as described herein. The non-processor circuits may include, but are not limited to, a radio receiver, a radio transmitter, signal drivers, clock circuits, power source circuits, and user input devices. As such, these functions may be interpreted as steps of a method to perform proper self-monitoring of congestive heart failure conditions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Congestive heart failure is a costly chronic disease that requires careful daily patient self-monitoring and self-administration of prescribed therapies for maintaining homeostasis. Embodiments of the disclosure contemplate that two of the primary metrics by which patients determine whether homeostasis is being maintained is body weight and blood pressure. When weight increases above a predefined limit by a certain amount, embodiments of the disclosure contemplate that a patient should initiate self-administration of prescribed therapies to maintain homeostasis. Examples of such therapies include taking a diuretic or an additional diuretic to relieve fluid accumulation. However, when weight increases above the certain amount, medical treatment is required to prevent serious complications.

Accordingly, to provide an improved electronic device that allows laypeople to know whether they are properly self-monitoring and self-administering prescribed therapies to maintain homeostasis when suffering from congestive heart failure, embodiments of the disclosure comprise a patient scale that provides visual cues indicating that a patient diagnosed with congestive heart failure is experiencing a fluid shift from decreased function of the heart muscle. Advantageously, embodiments of the disclosure guide the patient into action when homeostasis is not being maintained, and in one or more embodiments, instructing the patent as to whether self-administration of therapies or medical treatment is required.

In one or more embodiments, a large flat scale is provided. To accommodate older patients, in one embodiment the scale is large and flat, approximating a front door mat in length and width and a yoga mat in thickness. A plurality of light sources, operable with the control circuit in the scale, selectively present one of three color-coded indications to indicate whether homeostasis is being maintained, self-administration of therapies is required, or whether medical treatment, e.g., treatment by a doctor at a hospital, are required to prevent serious complications.

In one embodiment, the light sources provide a visual cuing by presenting one of green light, yellow light, or red light, each of which indicates whether intervention is required. For example in one embodiment where the lights are green, homeostasis is being maintained. When the lights are yellow, the patient requires self-management to prevent further congestive heart failure complications. When the light is red, the patient requires medical intervention to prevent the congestive heart failure complications. In one or more embodiments a removable memory device can collect data as the user measures their weight so that this data can be shared with health care services providers. This information can be used to modify or revise prescribed therapies.

Figure 2:
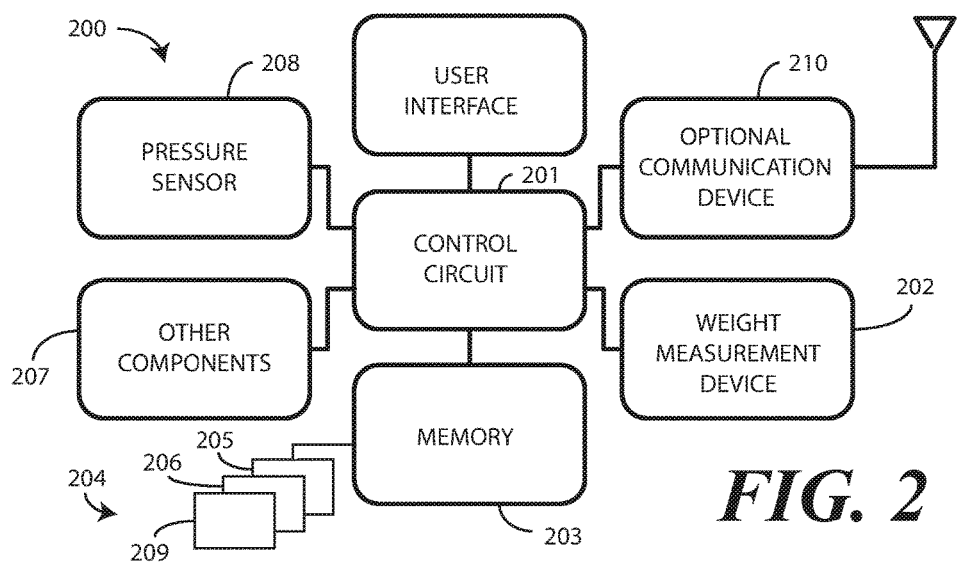
FIG. 2 illustrates a schematic block diagram of one explanatory electronic device in accordance with one or more embodiments of the disclosure.

Turning now to FIGS. 1 and 2, illustrated therein is one embodiment of a weight scale 100, and a schematic block diagram 200 of the components of a weight scale 100, respectively, when configured in accordance with one or more embodiments of the disclosure. In one or more embodiments, the weight scale 100 comprises a housing 101. In one embodiment, the housing 101 defines a substantially flat planar surface 102. In other embodiments, the housing 101 may include curves and contours instead. For example, indentations indicating where a patient should stand may be included. Other curves and contours will be obvious to those of ordinary skill in the art having the benefit of this disclosure. In one or more embodiments, the housing 101 is manufactured from, or alternatively is covered in, a compliant material such as a soft rubber or plastic.

In one embodiment, the substantially flat planar surface 102 is large and welcoming and is easily accessible by elderly or infirm patients without the threat of tripping or falling. For example, in one embodiment the substantially flat planar surface 102 has length 104 and width 103 dimensions resembling that of a conventional a front door mat. In one embodiment, the length 104 is 18 inches, while the width 103 is 30 inches. In another embodiment, the width 103 is 47 inches, while the length 104 is 21 inches. Other dimensions will be obvious to those of ordinary skill in the art having the benefit of this disclosure. In one embodiment, the substantially flat planar surface 102 of the housing 101 is thin, e.g., about the thickness of a conventional yoga mat. For example, in one embodiment the thickness of the housing 101 is one eighth of an inch thick. In another embodiment, the thickness of the housing 101 is one quarter of an inch thick. Other thicknesses will be obvious to those of ordinary skill in the art having the benefit of this disclosure.

In one or more embodiments, a weight measurement device 202 is operable with the substantially flat planar surface 102. The weight measurement device 202 can include one or more weight sensors. As will be described in more detail below, other sensors, including pressure sensors and/or temperature sensors can be incorporated into the weight measurement device 202 as well. The weight measurement device 202 is operable to measure the weight of a predefined user when the predefined user stands on the substantially flat planar surface 102. As will be shown below, data and other information relating to a specific user can be stored in a memory 203 of the electronic device, including a first predefined weight threshold and a second predefined weight threshold. In many embodiments, these weight thresholds are defined by a medical doctor after a person has been diagnosed with a congestive heart failure condition. Accordingly, many embodiments of the disclosure are customized to a specific patient, i.e., the "predefined user" as that term is used herein.

In one or more embodiments, the weight measurement device 202 and its corresponding weight sensors are operable to receive a mechanical force and convert it into electronic signals that can be processed by a control circuit 201. The weight measurement device 202 may deliver weight measurements to the control circuit 201 directly. Alternatively, they weight measurement device 202 may deliver electronic signals to the control circuit 201 that are subsequently processed by the control circuit 201 to determine the weight of the predefined user. The weight measurement device may include signal-processing components, including analog to digital converters, registers, and other data processing components. One, two, three, four, or more weight sensors can be included in the weight measurement device 202.

In one or more embodiments, a display 105 is disposed along the substantially flat planar surface 102. The display 105 may be a liquid crystal display, an organic light emitting diode display, an active matrix organic light emitting diode display, or other display operable to present indicia 106 to a user. In at least one embodiment, the display 105 is touch-sensitive so as to define a user input device for the weight scale 100.

In one embodiment, the display 105 is large, and presents numbers and text on the display in a large enough font that elderly people and those having poor vision can easily see the numbers and text. In one or more embodiments, the control circuit 201 is operable to cause the user's weight to be presented on the display 105 as the indicia 106. As will be shown in more detail below, other information, such as requests for indications of food ingestion information can be presented on the display 105 as well. Other indicia 106 will be obvious to those of ordinary skill in the art having the benefit of this disclosure.

In one or more embodiments, the weight scale 100 also includes a control circuit 201. The control circuit 201 can be operable with the other components of the weight scale 100, including the weight measurement device 202, the display 105, and the plurality of light sources disposed along the substantially flat planar surface 102. In one embodiment, the control circuit 201 comprises one or more processors. The control circuit 201, in one or more embodiments, is responsible for performing the various functions of the weight scale 100. The control circuit 201 can be a microprocessor, a group of processing components, one or more Application Specific Integrated Circuits (ASICs), programmable logic, or other type of processing device.

In one embodiment, the control circuit 201 can be configured to process and execute executable software code to perform the various functions of the weight scale 100. A storage device, such as memory 203, can be used to store any executable software code used by the control circuit 201 for weight scale operation. The executable software code used by the control circuit 201 can be configured as one or more modules that are operable with the control circuit 201. Such modules can store instructions, control algorithms, and so forth. The instructions can instruct processors or the control circuit 201 to perform the various steps, including obtaining a weight of a predefined user, actuating the plurality of light sources, receipt of user inputs from the various user interface components of the weight scale 100, and the corresponding methods described below.

In one or more embodiments, a plurality of light sources is also disposed along the substantially flat planar surface 102. In this illustrative example, the plurality of light sources includes three light sources: a first light source 107, a second light source 108, and a third light source 109. In one or more embodiments, these light sources are separate from the display 105 so that they can easily be identified by a user. The light sources can be laser-based, diode based, filament based, or other types of light sources. Illustrating by example, in one embodiment the plurality of light sources comprises an array of three light emitting diode light sources.

In one embodiment, the light sources are operable with the control circuit 201 to selectively present one of three color-coded indications. For example, in one embodiment the first light source 107 comprises a green light emitting diode, the second light source 108 comprises a yellow light emitting diode, and the third light source 109 comprises a red light emitting diode. In another embodiment, each of the first light source 107, the second light source 108, and the third light source 109 each comprise white light emitting diodes capable of emitting any of red, green, yellow, or white light. While LEDs are one example of light sources, others will be obvious to those having the benefit of this disclosure.

In one or more embodiments, patient information 204 corresponding to the predefined user, and relating to a congestive heart failure diagnosis, is stored within the memory 203 of the weight scale 100. For example, when measuring weight, the control circuit 201 can record the weight in a weight log 209 stored in the memory 203. This patient information 204 can also comprise weight thresholds, foot sizes, temperature thresholds, dietary information, and other information. The patient information 204, in one embodiment, is specifically prescribed to the predefined user by medical personnel, e.g., a patient's treating physician, nurse practitioner, or the like.

In one embodiment, the patient information 204 comprises at least a first predefined weight threshold 205 and a second predefined weight threshold 206. Embodiments of the disclosure contemplate that a principal metrics by which patients determine whether a congestive heart failure management homeostasis is being maintained is body weight. When weight increases above a predefined limit by a certain amount, embodiments of the disclosure contemplate that a patient should initiate self-administration of prescribed therapies to maintain homeostasis. Examples of such therapies include taking a diuretic or an additional diuretic to relieve fluid accumulation. However, when weight increases above the certain amount, medical treatment is required to prevent serious complications.

Accordingly, in one or more embodiments the first predefined weight threshold 205 and second predefined weight threshold 206 define the ranges where homeostasis is being maintained, the predefined user should engage in self administration of prescribed therapies, or should seek medical assistance. Illustrating by example, when a predefined user's weight is below the first predefined weight threshold 205, homeostasis is being maintained. However, when the predefined user's weight rises into a range between the first predefined weight threshold 205 and the second predefined weight threshold 206, the predefined user should engage in self administration of therapy such as taking a diuretic or an additional diuretic to relieve fluid accumulation. However, when the predefined user's weight rises above the second predefined weight threshold 206, the predefined user should seek immediate medical attention.

Advantageously, in one or more embodiments the weight scale 100 and its plurality of light sources provide a visual cuing regarding in which state the predefined user may be. Illustrating by example, the control circuit 201 can cause one of the first light source 107, the second light source 108, or the third light source 109 to present one of green light, yellow light, or red light. The color of light can indicate whether treatment is required. If, for example, the first light source 107 is illuminated, this can comprise a visual cue that homeostasis is being maintained. By contrast, when the second light source 108 is illuminated, this can comprise a visual cue that the predefined user requires self-management to prevent congestive heart failure complications. When the third light source 109 is illuminated, this can comprise a visual cue that the predefined user requires medical assistance to prevent the congestive heart failure complications.

Accordingly, in one or more embodiments the control circuit 201 is operable to selectively cause one of the first light source 107, the second light source 108, or the third light source 109 to actuate after comparing the weight of the predefined user, as determined by the weight measurement device 202, to the first predefined weight threshold 205 and the second predefined weight threshold 206. Illustrating by example, when the weight determined by the weight measurement device 202 is between the below the first predefined weight threshold 205, in one embodiment the control circuit 201 causes at least one light source of the plurality of light sources to present a first color indication. In this illustrative embodiment, the control circuit 201 causes the first light source 107 to emit green light. In one or more embodiments, the first color indication indicates that homeostasis in the management of congestive heart failure is being maintained.

However, when the weight is between the first predefined weight threshold 205 and the second predefined weight threshold 206, in one embodiment the control circuit 201 causes at least one light source of the plurality of light sources to present a second color indication. In this illustration, the control circuit 201 can cause the second light source 108 to emit yellow light. In one or more embodiments, this second color indication indicates that self-management is required to prevent congestive heart failure complications. Examples of self-management include taking a diuretic or taking an additional diuretic.

When the weight is above the second predefined weight threshold 206, the control circuit 201 can cause at least one light source of the plurality of light sources to present a third color indication. In this illustrative embodiment, the third color indication occurs when the control circuit 201 causes the third light source 109 to emit red light. In one or more embodiments, this third color indication indicates that medical assistance, such as that from a hospital by a medical doctor, is required to prevent congestive heart failure complications. Accordingly, the predefined user seek medical attention immediately. When the third color indication occurs, the patient can relay this fact to medical personnel to assist in additional diagnoses.

The weight scale 100 can include other components 207. The other components 207 may include a video input component such as an optical sensor, an audio input component such as a microphone, and a mechanical input component such as button or key selection sensors. As will be described in more detail below with reference to FIG. 8, in one or more embodiments the light sources may be configured additionally as buttons so as to be capable of presenting not only the color indications described above, but can receive user input as well.

The other components 207 can also include a touch pad sensor, touch screen sensor, or a capacitive sensor. Similarly, the other components 207 can include output components such as video, audio, and/or mechanical outputs. Some of these will be described below with reference to FIG. 16. Other examples of output components include audio output components such as alarms and/or buzzers and/or a mechanical output component such as vibrating or motion-based mechanisms. The other components 207 can include a device interface to provide a direct connection to auxiliary components or accessories for additional or enhanced functionality.

In some instances, it is helpful to know not only the weight of the predefined user, but how much area of the substantially flat planar surface 102 they are in contact with. For example, a person suffering from edema, which is a condition caused when excess fluid collects in the body, and in particular in the lower extremities, may need to seek medical assistance when dealing with a congestive heart failure condition. Accordingly, it can be advantageous to know not only when the predefined user touches the substantially flat planar surface 102, but also how much area the predefined user's feet occupy along the substantially flat planar surface 102. Accordingly, in one or more embodiments a pressure sensor 208 can be included to provide a pressure map of body parts contacting the substantially flat planar surface 102. In one embodiment, the pressure sensor 208 is configured as an array of force sensors, such as force sense resistors, that are placed along the substantially flat planar surface 102. Operation of the pressure sensor 208 will be described in more detail below with reference to FIG. 4.

In one or more embodiments, the weight scale 100 also includes an optional communication circuit 210 that can be configured for wired or wireless communication with one or more other devices or networks. The networks can include a wide area network, a local area network, and/or personal area network. The communication circuit 210 may also utilize wireless technology for communication, such as, but are not limited to, peer-to-peer or ad hoc communications. The communication circuit 210 can include wireless communication circuitry, one of a receiver, a transmitter, or transceiver, and one or more antennas. The communication circuit 210 can, operating in conjunction with the control circuit 201, transmit information to remote electronic devices or "the cloud." For example, the communication circuit 210 can transmit the weight log 209 to a remote electronic device in one or more embodiments.

It is to be understood that the weight scale 100 of FIG. 1, and the schematic block diagram 200 of FIG. 2, are each provided for illustrative purposes only and for illustrating components of weight scale 100 in accordance with embodiments of the disclosure. Accordingly, for example, the schematic block diagram 200 is not intended to be a complete schematic diagram of the various components required for a weight measurement device configured in accordance with one or more embodiments of the disclosure. Therefore, other weight measurement devices in accordance with embodiments of the disclosure may include various other components not shown in FIG. 1 or 2, or may include a combination of two or more components or a division of a particular component into two or more separate components, and still be within the scope of the present disclosure.

Figure 3:
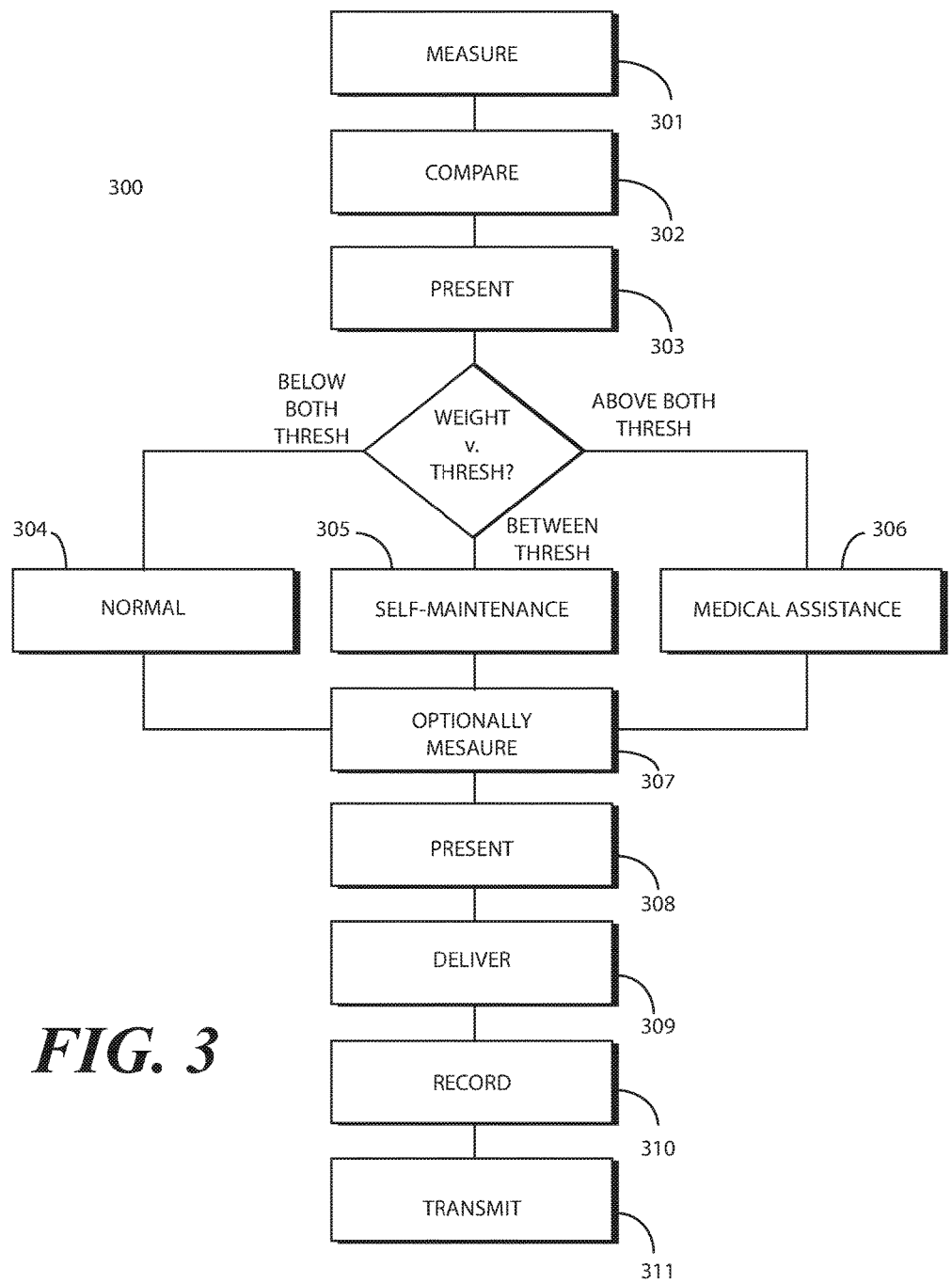
FIG. 3 illustrates one explanatory method in accordance with one or more embodiments of the disclosure.

Turning to FIG. 3, illustrated therein is one method 300 configured in accordance with one or more embodiments of the disclosure. At step 301, the method 300 includes measuring, with a weight measurement device, a weight of a predefined user. Step 302 includes comparing the weight, with control circuit, to at least a first predefined weight threshold and a second predefined weight threshold. At optional step 303, the method 300 can include presenting the weight measured at step 301 on a display. In one or more embodiments, the predefined parameters are prescribed for a particular patient by a medical professional, such as a medical doctor.

After step 303, the method 300 in one embodiment comprises presenting an indication regarding whether a predefined user is maintaining a homeostasis condition in the treatment of congestive heart failure. In one embodiment, the indication is one of three indications that represent three distinct states: a normal state in which homeostasis is being maintained, a self-management state in which self-administration of therapies is required to prevent congestive heart failure complications, and a medical assistance state in which medical assistance is required to avoid congestive heart failure complications.

In one embodiment, as shown at step 304, when the weight is below the first predefined weigh threshold, a homeostasis condition is being maintained. Thus, at step 304, in one embodiment the method 300 presents a first color indication. However, where the weight is between the first predefined weight threshold and the second predefined weight threshold, the predefined user requires self-management to prevent further congestive heart failure complications. Accordingly, in one embodiment at step 305 the method 300 includes presenting a first color indication when the predefined user requires self-management to prevent congestive heart failure complications. In one embodiment, the first color indication comprises the presentation of yellow light.

When the weight is above the second predefined weight threshold, in one embodiment this means that the predefined user requires medical assistance to prevent the congestive heart failure complications. Accordingly, in one embodiment at step 306 the method 300 includes presenting a second color indication when the predefined user requires medical assistance to prevent congestive heart failure complications. In one embodiment, the second color indication comprises the presentation of red light.

Figure 4:
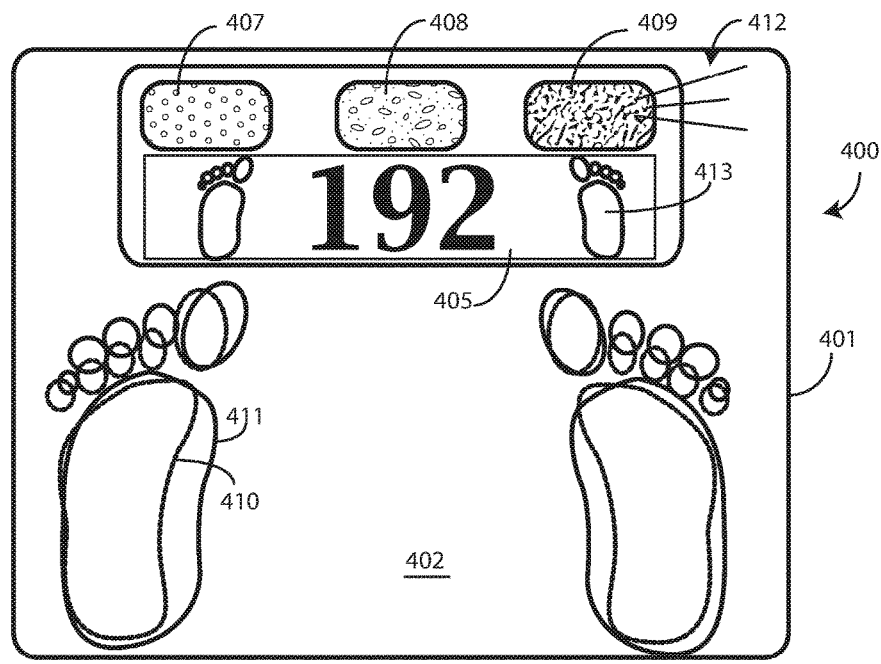
FIG. 4 illustrates another explanatory electronic device in accordance with one or more embodiments of the disclosure.

In one embodiment, at optional step 307, the method 300 includes measuring, with a pressure sensor, a contact area of the predefined user with the housing of a measurement scale. At optional step 308, the method 300 can include causing one or more of a display or one or more output devices to present an indication of edema when the contact area exceeds a predefined threshold. At optional step 309, where the weight is between the first predefined weight threshold and the second predefined weight threshold, the method 300 can include delivering, with one or more audio output devices, instructions for one or more of accomplishing the self-management to prevent the congestive heart failure complications or obtaining the medical assistance to prevent the congestive heart failure complications. For example, audio may be delivered saying, "you should probably consider taking a diuretic to eliminate fluids." At optional step 310, the method 300 can include recording, with control circuit, the weight in a weight log. At optional step 311, the method 300 can include transmitting the weight log to another device Turning now to FIG. 4, illustrated therein is another weight measurement device 400 configured like that described above with reference to FIGS. 1 and 2, but that includes the pressure sensor (208) coupled to the housing 401. As noted above, the pressure sensor (208) is operable in one embodiment to measure a contact area 410 of the predefined user with the substantially planar surface 402 of the housing 401.

In one or more embodiments, the pressure sensor (208) measures the contact area 410 of the predefined user with the housing 401. Where the contact area 410 exceeds a predefined threshold, as shown by contact area 411, in one or more embodiments the control circuit of the weight measurement device 400 causes one or more of the display 405 or the one or more output devices 407,408,409, which are light sources in this example, to present an indication of edema. In this illustrative embodiment, both the display 406 and the output devices 407,408,409 present this indication, as the third output device 409 presents red light 412 and the display 405 presents an indication 413 of edema. Accordingly, the predefined user is able to seek medical assistance. when the contact area exceeds a predefined threshold.

Thus, as shown and described in FIG. 4, the pressure sensor (208) is able to measure and/or show the area of contact of a user's foot with the substantially planar surface 402. Advantageously, this allows the weight measurement device 400 to measure the contact area 411 of each foot and monitor any changes that may indicate edema. In one or more embodiments, this information is recorded in the memory by the control circuit so that a physician or other medical professional can analyze the information in real time or at a later date.

Figure 5:
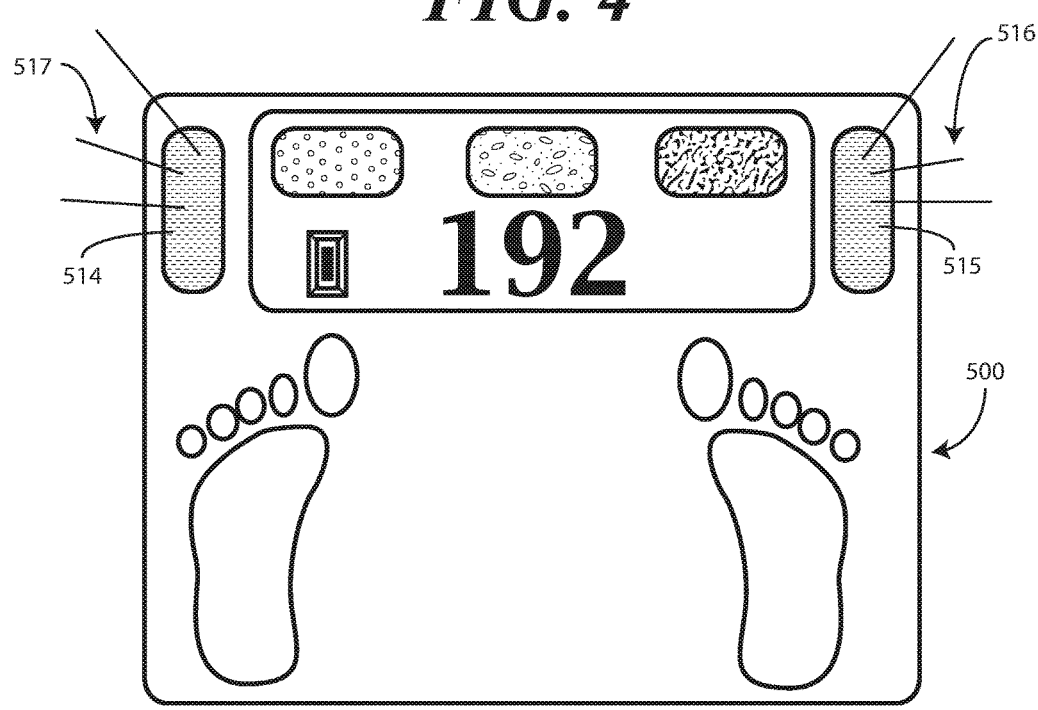
FIG. 5 illustrates yet another explanatory electronic device in accordance with one or more embodiments of the disclosure.

Turning now to FIG. 5, illustrated therein is another weight measurement device 500 configured like that described above with reference to FIGS. 1 and 2, but that includes one or more audio output devices 514,515. The audio output devices 514,515 are configured as loudspeaker disposed along the housing 501 of the weight measurement device 500.

In one or more embodiments, where the measured weight is between the first predefined weight threshold and the second predefined weight threshold, the control circuit outputs instructions 516 for one or more of accomplishing the self-management to prevent the congestive heart failure complications. Where the measured weight is above the second predefined weight threshold, the control circuit outputs instructions 517 for obtaining the medical assistance to prevent the congestive heart failure complications. In this illustrative embodiment, the instructions 516,517 comprise audible sounds telling the predefined user what they need to know. Instructions 516 may comprise, "You should take a diuretic." Instructions 517 may comprise, "Call 911 or proceed to the hospital." These are examples only. Other instructions 516,517 will be obvious to those of ordinary skill in the art having the benefit of this disclosure.

Figure 6:
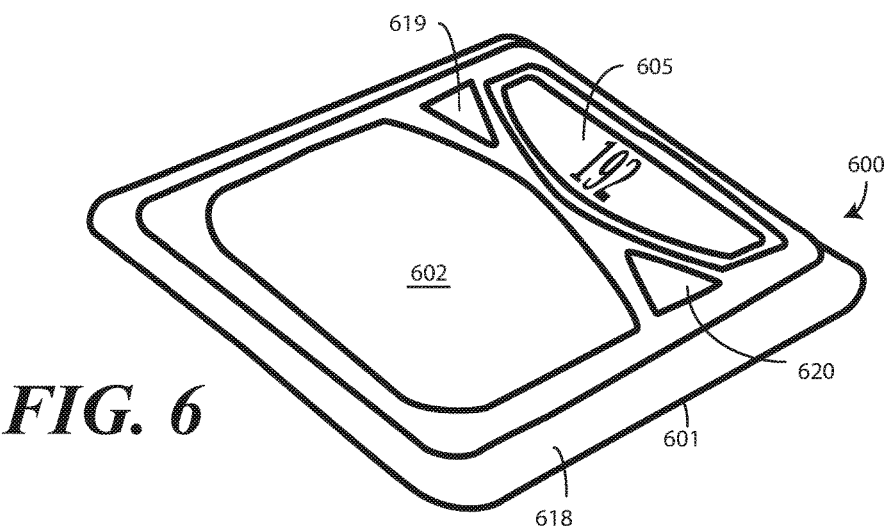
FIG. 6 illustrates still another explanatory electronic device in accordance with one or more embodiments of the disclosure.

Turning now to FIG. 6, illustrated therein is another explanatory weight measurement device 600 configured in accordance with one or more embodiments of the disclosure. In this illustrative embodiment, the weight measurement device 600 includes a communication circuit so that it can transmit patient information wirelessly to a cloud server so that a physician or other medical professional can access the same.

As previously described, this weight measurement device 600 comprises a housing 601. The housing 601 defines a substantially planar surface 602. In this illustrative embodiment, the substantially planar surface 602 comprises a textured mat with a pressure sensor integrated therein. The textured mat is manufactured from a soft, compliant material to increase comfort and reduce the "clinical" look of metal to make the weight measurement device 600 more inviting for home use.

In this illustrative embodiment, the housing 601 includes gradually sloping portions 618 that taper inward from the base of the housing 601 to the substantially planar surface 602. The inclusion of the gradually sloping portions 618, while optional, reduces the risk that a user will trip when mounting the weight measurement device 600.

Figure 7:
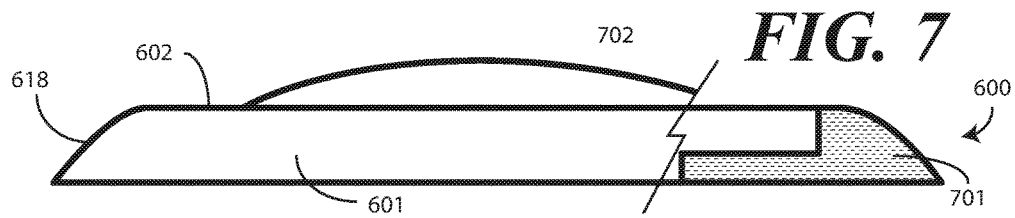
FIG. 7 illustrates another explanatory electronic device in accordance with one or more embodiments of the disclosure.

Turning briefly to FIG. 7, illustrated therein is a partial cross section of the housing 601. The mechanics and housing 601 of the weight measurement device 600 of this illustrative embodiment sit within a rubber enclosure 701. In this embodiment, the rubber enclosure 701 defines the gradually sloping portions 618 and ensures that the weight measurement device 600 does not slide across the floor when in use. An additional detail that can be seen in FIG. 7 is the protective dome 702 that is attractively raised above the substantially planar surface 602.

Now turning back to FIG. 6, in this illustrative embodiment a display 605 is disposed along the substantially planar surface 602. In this embodiment, the display 605 comprises a large, easy-to-read digital display employing a liquid crystal layer. In one embodiment, the display 605 is backlit. The backlight of the display 605 is operable to change colors in one embodiment, and can project any of red, green, or yellow through the display 605 to provide the first color indication, the second color indication, and the third color indication as previously described.

In one or more embodiments, the display 605 can be configured to flash these color indications depending upon the user's weight and the physician defined first predefined weigh threshold and the second predefined weight threshold. In one embodiment the display 605 comprises a raised and beveled display. Where raised and beveled, this design aesthetic creates a soft, yet present, appearance to the user.

Alternatively, separate lighting provided by light source 619 and light source 620 can provide the first color indication, the second color indication, and the third color indication. In one embodiment, each of light source 619 and light source 620 is a light emitting diode configured to produce at least three different colors of light. When a user's weight is between the below the first predefined weight threshold, each of light source 619 and light source 620 can present a first color indication, such as green. When the weight is between the first predefined weight threshold and the second predefined weight threshold, each of light source 619 and light source 620 can present a second color indication, such as yellow. When the weight is above the second predefined weight threshold, each of light source 619 and light source 620 can present a third color indication.

Figure 9:
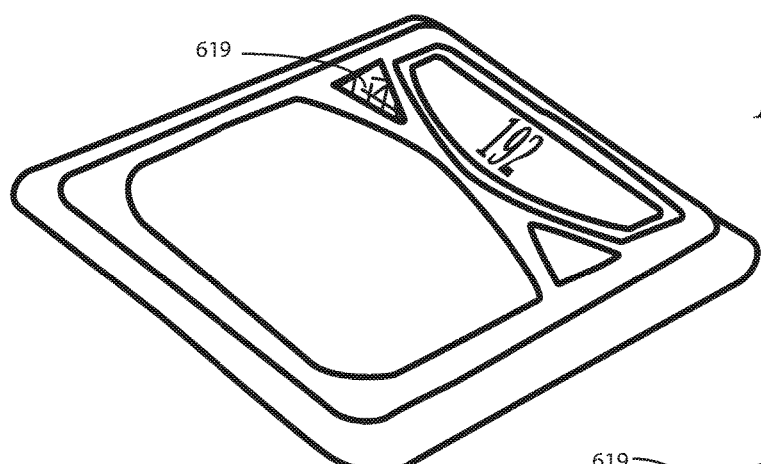
FIGS. 9-11 illustrate various operating modes of the explanatory electronic device of FIG. 6.
Figure 10:
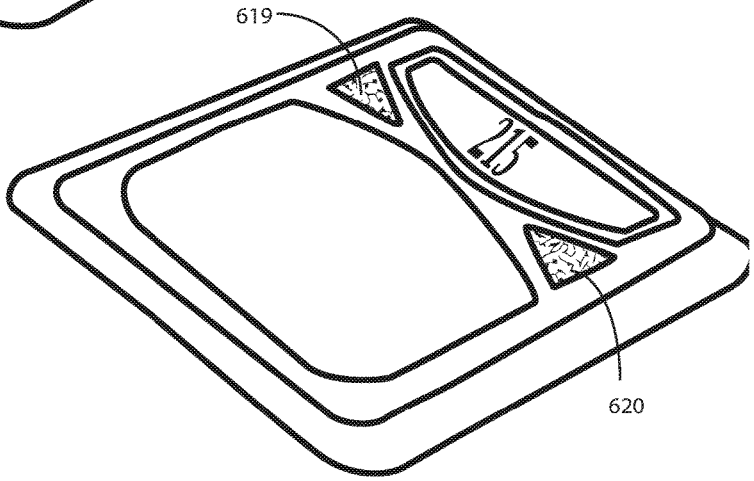
Figure 11:
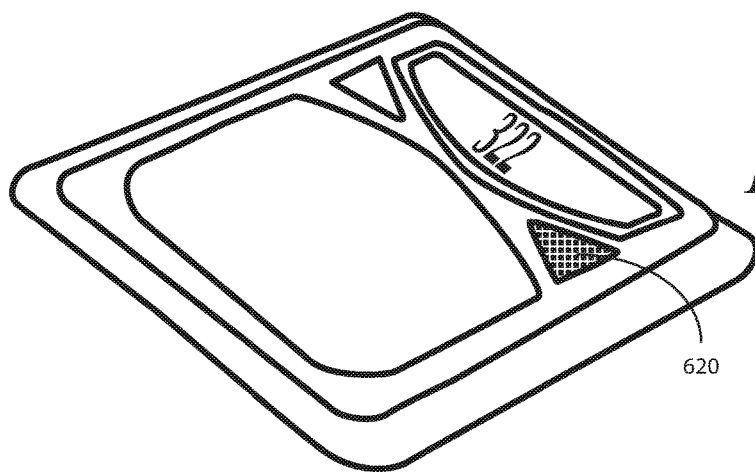

Alternatively, other techniques can be used. Turning briefly to FIGS. 9-11, where only two light sources 619,620 are used, the three states of a normal state in which homeostasis is being maintained, a self-management state in which self-administration of therapies is required to prevent congestive heart failure complications, and a medical assistance state in which medical assistance is required to avoid congestive heart failure complications can be presented by turning on different combinations of light sources 619,620.

Illustrating by example, when a user's weight is between the below the first predefined weight threshold, a first color indication can be presented by actuating only light source 619, as shown in FIG. 9. When the weight is between the first predefined weight threshold and the second predefined weight threshold, a second color indication can be presented by turning on both light source 619 and light source 620, as shown in FIG. 10. Similarly, when the weight is above the second predefined weight threshold, a third color indication can be presented by actuating only light source 620. This is just one example of the myriad of ways that three states can be presented with two light sources. Numerous others will be obvious to those of ordinary skill in the art having the benefit of this disclosure.

Figure 8:
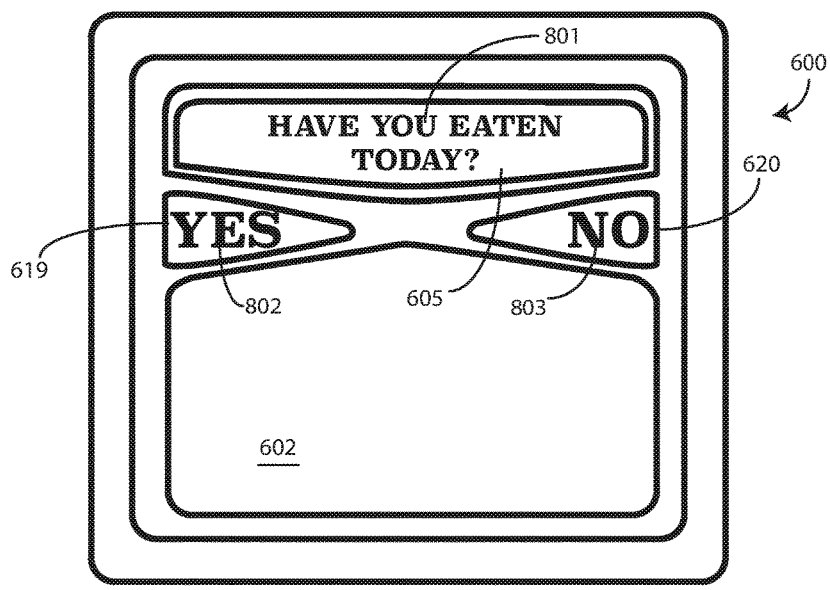
FIG. 8 illustrates another explanatory electronic device in accordance with one or more embodiments of the disclosure.

Turning now to FIG. 8, in one or more embodiments the control circuit of the weight measurement device 600 can cause the display 605 to present a prompt 801 requesting food ingestion information. In this illustrative embodiment, the prompt 801 comprises the words, "Have you eaten today?"

In one or more embodiments, the first light source 619 and the second light source 620 each comprise touch-sensitive user input devices. For example, the first light source 619 and the second light source 620 can include capacitive touch sensors in one embodiment. Alternatively, the first light source 619 and the second light source 620 can be configured as push buttons that a user presses with their toe.

In one embodiment, the first light source 619 and the second light source 620 are configured to present graphical indicia 802,803 to the user. In this illustrative embodiment, the graphical indicia 802,803 comprise the words "Yes," and "No," respectively. Accordingly, when the display 605 presents the prompt 801 requesting food ingestion information, the first light source 619 and the second light source 620, which are configured as user input devices, can present the graphical indicia 802,803. A user can then deliver food ingestion information by touching the appropriate one of the first light source 619 and the second light source 620. If they have eaten, they will touch the first light source 610. If they have not, they can touch the second light source 620.

In one or more embodiments, the control circuit of the weight measurement device 600 features an internal clock. Where the weight measurement device 600 includes a communication circuit, it can connect, for example, to the Internet via a Wi-Fi connection. This can allow the internal clock to be automatically updated.

In one or more embodiments, at a predefined time, such as four o'clock AM, the display 605 is configured to slowly pulse a bright blue light to remind the predefined user to step on the substantially planar surface 602 to measure their weight. However, in this illustrative embodiment, prior to being weighed, the predefined user may be required to answer several questions regarding their health. One example of such a question is the prompt 801 requesting food ingestion information. In this illustrative embodiment, the prompt 801 comprises the words, "Have you eaten today?" Other examples of questions include "are you wearing clothes," to ensure that a proper weight measurement is obtained. Still other questions will be obvious to those of ordinary skill in the art having the benefit of this disclosure.

As noted above, in one embodiment the predefined user can respond by stepping on, or otherwise touching, the appropriate one of the first light source 619 and the second light source 620. In one embodiment, the predefined user must answer these questions every time prior to having their weight measured.

In one embodiment, the control circuit of the weight measurement device 600 records the responses to these questions in memory as a Boolean response in a data field. Additionally, measurements such as foot area and weight can be attached to the answers. Thus, when the communication uploads this information to the cloud, a physician can consider the answers in addition to the measurements. For example, if the predefined user was wearing clothes, the physician can include an adder for the weight of the clothing when considering the weight measurement. In one or more embodiments, the weighing process—including the presentation of any required questions—begins as soon as any weight over twenty pounds is applied to the substantially planar surface 602 as detected by the weight measurement device (202).

Figure 12:
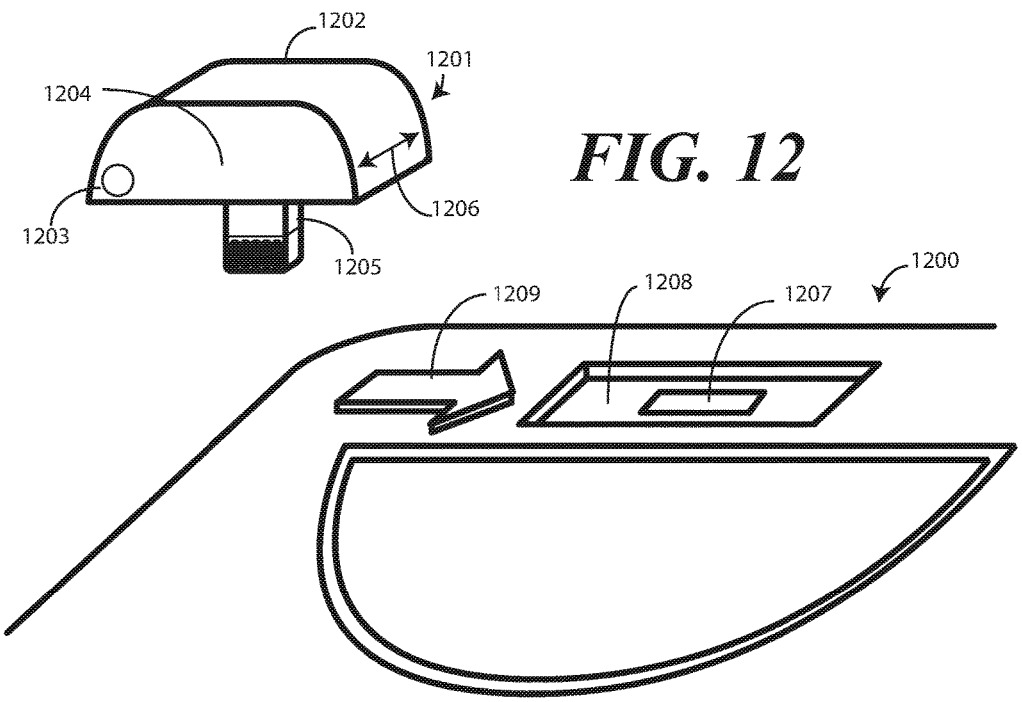
FIG. 12 illustrates another explanatory electronic device in accordance with one or more embodiments of the disclosure.

Turning now to FIG. 12, illustrated therein is another explanatory weight measurement device 1200 configured in accordance with one or more embodiments of the disclosure. In this illustrative embodiment, the weight measurement device 1200 includes a selectively detachable memory device 1201. In one embodiment, the selectively detachable memory device 1201 can store patient information. When the predefined user visits a physician or other medical professional, they may upload the patient information from the selectively detachable memory device 1201 to access the same.

In one embodiment, the housing 1202 of the selectively detachable memory device 1201 defines an aperture 1203 that can be coupled to a lanyard or strap or necklace. In one embodiment, the housing 1202 of the selectively detachable memory device 1201 also includes a legible area 1204 where the predefined user can write their name. Where desired, the electrical connector 1205 of the selectively detachable memory device 1201 can be retractable. In one or more embodiments, the width 1206 of the selectively detachable memory device 1201 is sufficiently wide that the housing 1202 will be rugged and durable.

In one embodiment, the selectively detachable memory device 1201 is configured as a universal serial bus "stick" that connects to a receiver 1207 disposed along the top of the weight measurement device 1200. In one embodiment, the electrical connector 1205 inserts in a straight, downwardly vertical direction for easy removal. In one embodiment, the receiver 1207 is disposed within a recessed well to ensure a good connection between the electrical connector 1205 and the receiver 1207. In one embodiment, an optional raised arrow 1209 is tooled into the housing 1210 of the weight measurement device 1200 to indicate to the predefined user where to insert the selectively detachable memory device 1201. Alternatively, the arrow can be printed instead of tooled.

Figure 13:
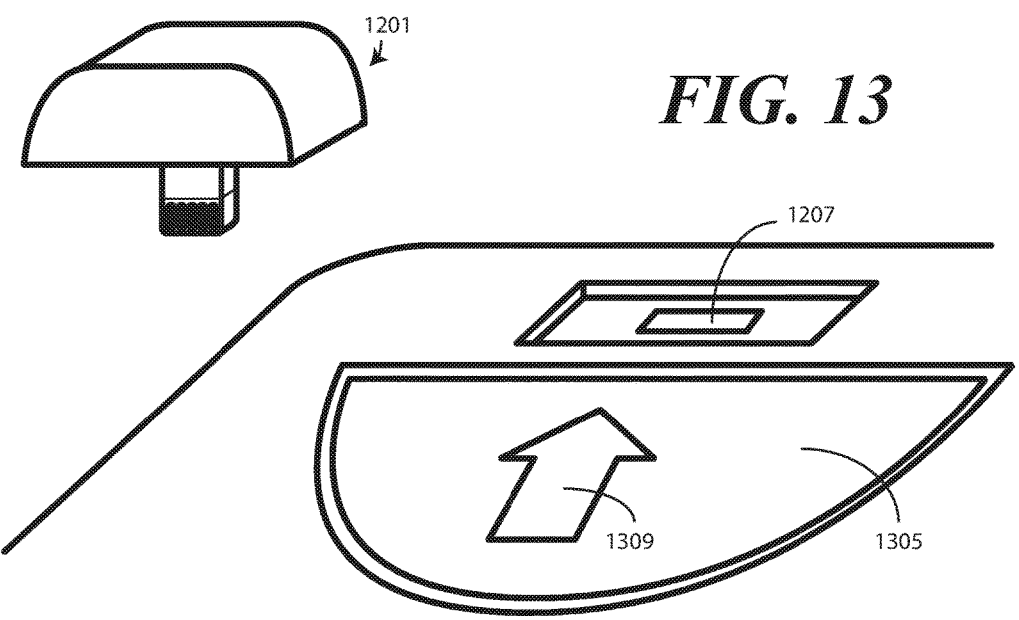
FIG. 13 illustrates yet another explanatory electronic device in accordance with one or more embodiments of the disclosure.

In another embodiment, turning now to FIG. 13, rather than including the optional raised arrow (120) to indicate where to insert the selectively detachable memory device 1201, an arrow 1309 can simply be presented on the display 1305. This can provide for a cleaner aesthetic. In one embodiment the display 1305 is a digital screen that presents the arrow 1309 as an animation or prompt instructing the user to insert the selectively detachable memory device 1201 into the receiver 1207.

Figure 14:
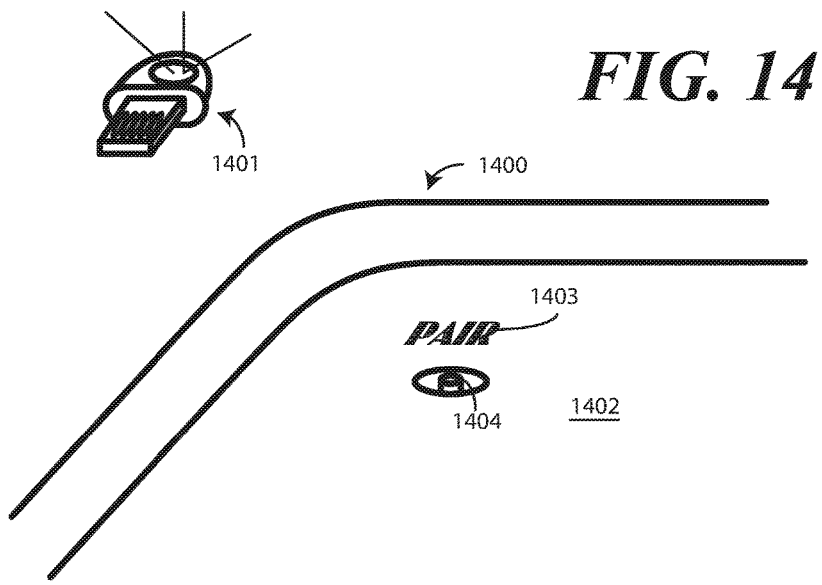
FIG. 14 illustrates still another explanatory electronic device in accordance with one or more embodiments of the disclosure.

As noted above, in one or more embodiments weight measurement devices configured in accordance with one or more embodiments of the disclosure include communication devices. Turning now to FIG. 14, in one embodiment the communication device 1401 is detachable.

As shown in FIG. 14, in one embodiment a detachable, universal serial bus communication device 1401 is configured as a near-field communication device employing BLUETOOTH.SUP.™ to pair with, and communicate with, a computer. When inserted into a receiver disposed along the weight measurement device 1400, the control circuit of the weight measurement device 1400 can upload patient information to the computer, a cloud server, or other remote device.

In one or more embodiments, disposed along the rear face 1402 of the weight measurement device 1400 are embossed text 1403 and a mechanical button 1404. When the detachable communication device 1401 is inserted into a receiver, the embossed text 1403 instructs a user to press the mechanical button 1404 to "pair" the weight measurement device 1400 with a companion device. This combination of the embossed text 1403 and the mechanical button 1404 allows a simple "one step" pairing process with a remote electronic device.

Figure 15:
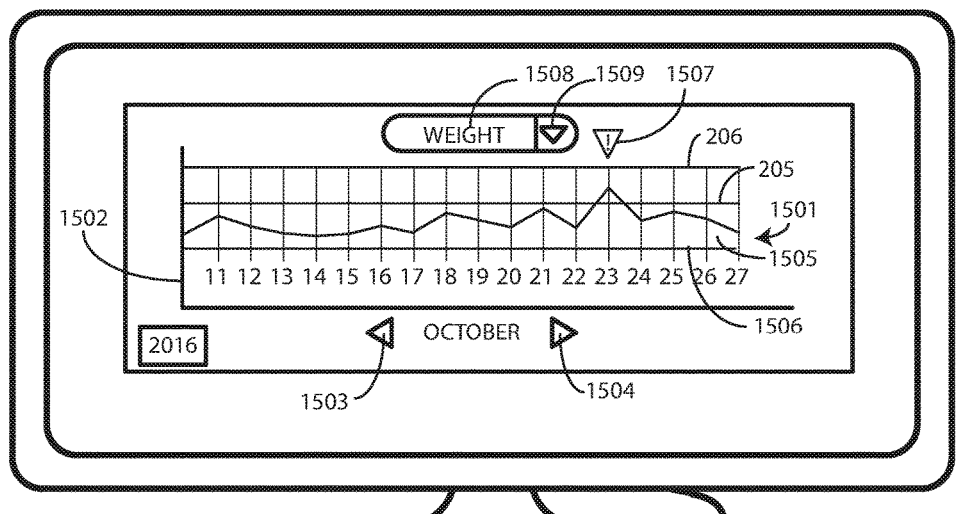
FIG. 15 illustrates one explanatory weight log in accordance with one or more embodiments of the disclosure.
Figure 15:
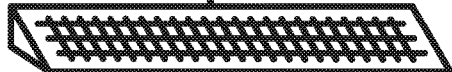

Turning now to FIG. 15, recall from above that patient information 1501 can be transmitted to remote devices through a communication device, or alternatively stored in a detachable memory device, in one or more embodiments. Advantageously, a physician or medical services provider can review this patient information 1501 at a later date or in real time.

The illustrative patient information 1501 of FIG. 15 includes an indication of the first predefined weight threshold 205 and the second predefined weight threshold 206, each of which is shown on a graph 1502. In this illustrative embodiment, the Y-axis is marked with units pertaining to a selected metric, which in this case is weight. The year in which the data are taken is shown in the lower left hand corner. The month is also shown. Arrows 1503,1504 allow for quick jumps between months. The dates of measurement appear along the X-axis of the graph 1502.

In one or more embodiments, the target zone defined beneath the first predefined weight threshold 205 and a minimum weight threshold 1506 can be highlighted for easy analysis. Alerts 1507 can appear for any measurements above the first predefined weight threshold 205. The metric being displayed can be identified on a pull-down menu 1508. An arrow 1509 allows for quick selection between data types. The various elements of the patient information 1501, and especially the data points of weight measurements, can be color-coded based upon the patient's measured weight as well.

Figure 16:
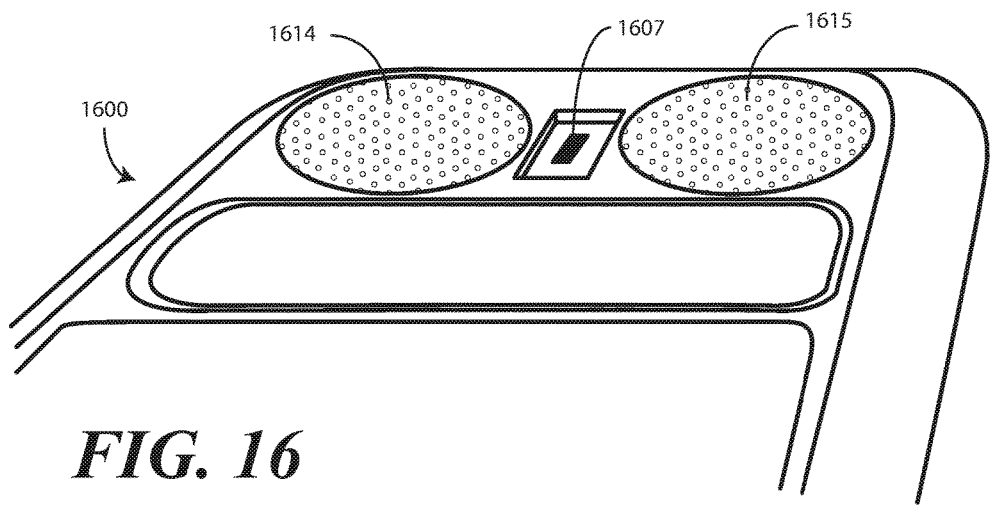
FIG. 16 illustrates another explanatory electronic device in accordance with one or more embodiments of the disclosure.

Turning now to FIG. 16, illustrated therein is another weight measurement device 1600 configured like that described above with reference to FIGS. 1 and 2, but that includes one or more loudspeakers 1614,1615. The embodiment of FIG. 16 illustrates that the loudspeakers 1614,1615, which can be added for visually impaired patients, can take any shape or size. The weight measurement device 1600 of FIG. 16 also includes a vertically aligned universal serial bus receiver 1607 for receiving a detachable memory device.

Figure 17:
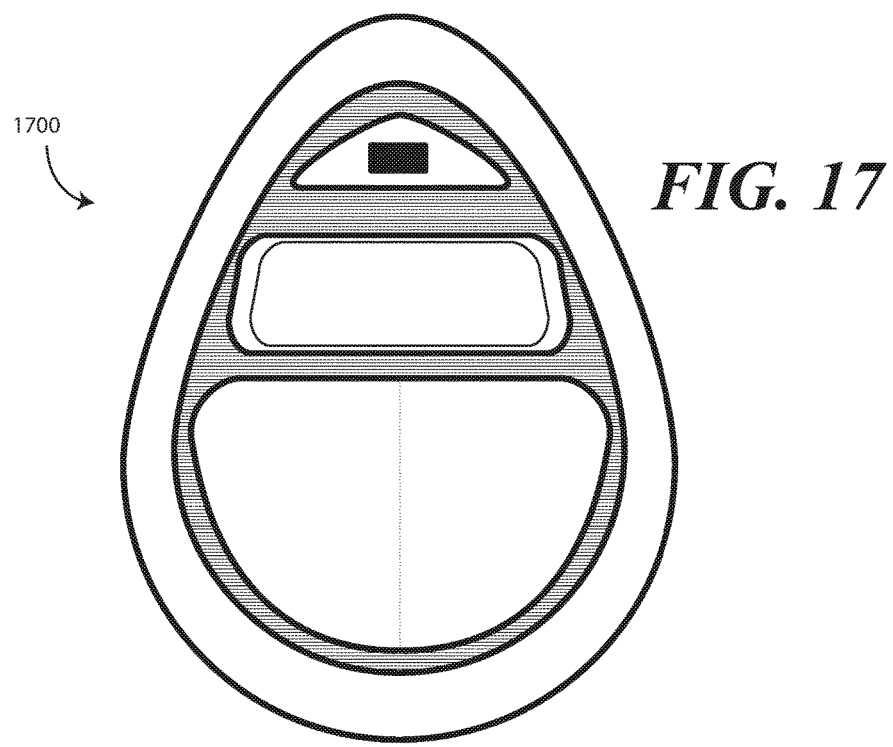
FIG. 17 illustrates still another explanatory electronic device in accordance with one or more embodiments of the disclosure.
Figure 18:
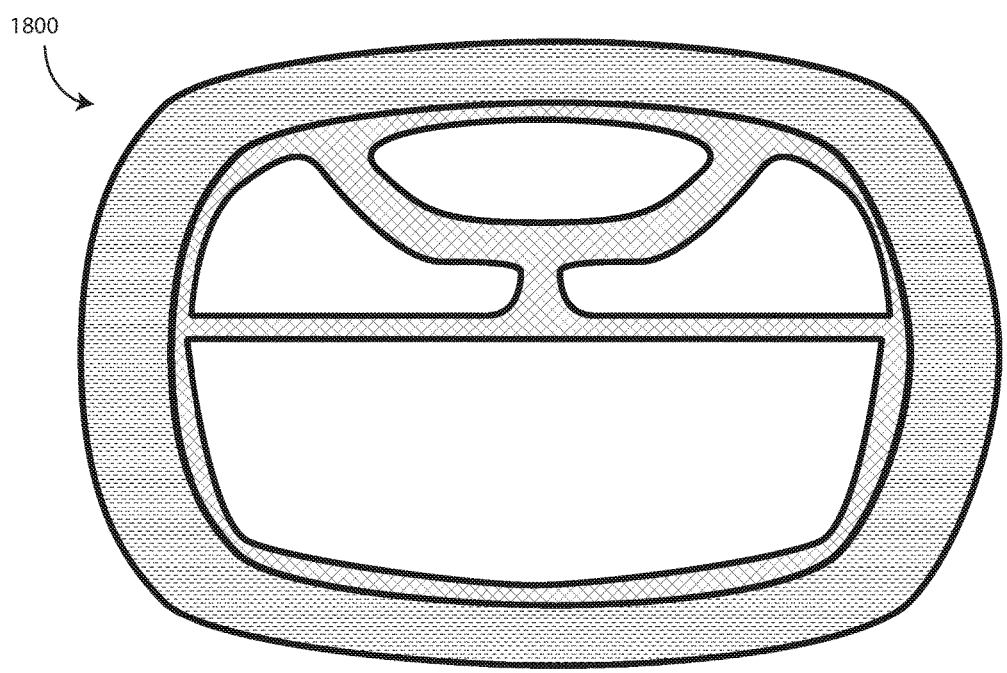
FIG. 18 illustrates yet another explanatory electronic device in accordance with one or more embodiments of the disclosure.
Figure 19:
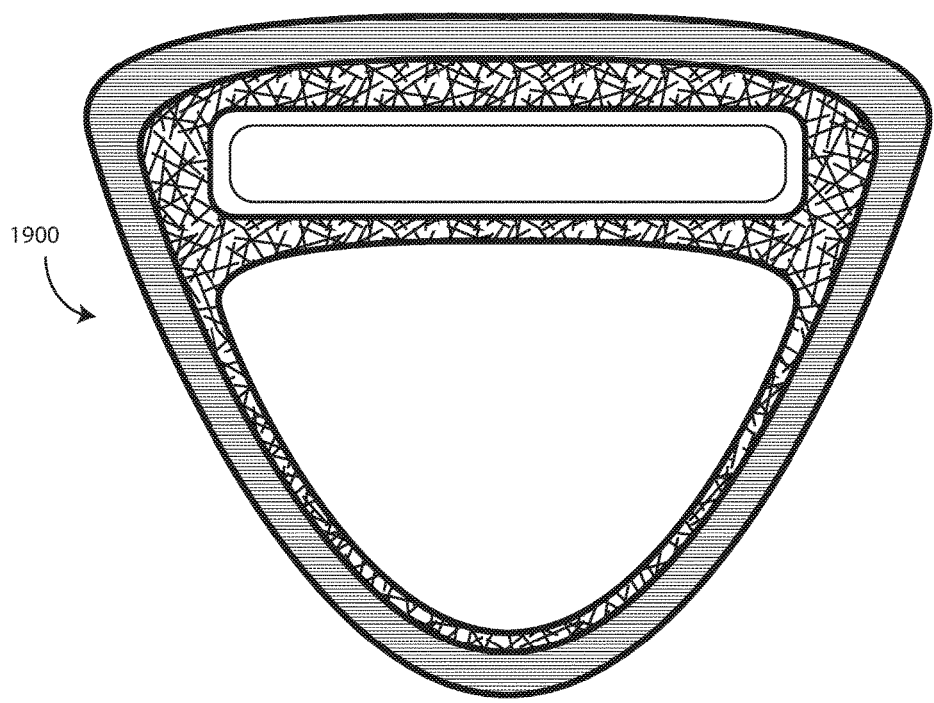
FIG. 19 illustrates another explanatory electronic device in accordance with one or more embodiments of the disclosure.

To this point, the various weight measurement devices have been shown as being substantially rectangular. However, embodiments of the disclosure are not so limited. Weight measurement devices can take other aesthetically pleasing designs as well. Illustrating by example, FIG. 17 illustrates a weight measurement device 1700 having an "egg" design. FIG. 18 illustrates a weight measurement device 1800 having a "pendant" design. FIG. 19 illustrates a weight measurement device 1900 with a "shield" design. These are examples only. Other aesthetically pleasing designs will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, weight and foot contact area were described as primary metrics of measurements in the examples above. However, blood pressure, temperature, and other measurements can be taken as well. Additionally, while congestive heart failure is one malady that embodiments of the disclosure can be configured to treat, numerous others where weight is a symptom of complications will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A weight scale, comprising:
a housing defining a substantially planar surface;
a weight measurement device measuring a weight of a predefined user when on the substantially planar surface;
a display disposed along the substantially planar surface;
control circuit operable with the display, the control circuit storing in a memory a first predefined weight threshold of the predefined user and a second predefined weight threshold corresponding the predefined user; and
a plurality of light sources, operable with the control circuit to selectively present one of three color-coded indications, wherein each of the plurality of light sources is separate from the display;
the control circuit further causing:
when the weight is below the first predefined weight threshold, at least one light source of the plurality of light sources to present a first color indication;
when the weight is between the first predefined weight threshold and the second predefined weight threshold, the at least one light source of the plurality of light sources to present a second color indication; and
when the weight is above the second predefined weight threshold, the at least one light source of the plurality of light sources to present a third color indication;
further comprising one or more audio output devices disposed along the housing, the control circuit outputting instructions for one or more of accomplishing self-management to prevent congestive heart failure complications or obtaining medical assistance to prevent the congestive heart failure complications.

2. The weight scale of claim 1, the control circuit further presenting the weight on the display.

3. The weight scale of claim 2, wherein the second color indication indicates the self-management is required to prevent congestive heart failure complications.

4. The weight scale of claim 3, wherein the third color indication indicates the medical assistance is required to prevent the congestive heart failure complications.

5. The weight scale of claim 4, wherein the first color indication comprises green light, the second color indication comprises yellow light, and the third color indication comprises red light.

6. The weight scale of claim 5, wherein the plurality of light sources comprises three light sources.

7. The weight scale of claim 4, the control circuit recording the weight in a weight log stored in the memory.

8. The weight scale of claim 7, further comprising a wireless communication circuit operable with the control circuit, the control circuit transmitting the weight log to a remote electronic device with the wireless communication circuit.

9. The weight scale of claim 7, further comprising a selectively detachable memory device, the control circuit also recording the weight log to the selectively detachable memory device.

10. The weight scale of claim 4, at least one light source of the plurality of light sources comprising a touch sensitive user input device.

11. The weight scale of claim 10, the control circuit causing the display to present a prompt requesting food ingestion information on the display.

12. The weight scale of claim 11, the control circuit receiving the good ingestion information from the touch sensitive user input device in response to presentation of the prompt.

13. The weight scale of claim 1, further comprising a pressure sensor coupled to the housing and measuring a contact area of the predefined user with the substantially planar surface.

14. The weight scale of claim 13, the control circuit causing the display to present an indication of edema when the contact area exceeds a predefined threshold.

15. A method comprising:
measuring, with a weight measurement device coupled to a housing of a weight scale, a weight of a predefined user;
presenting, with control circuit, the weight on a display disposed along the housing;
comparing, with the control circuit, the weight to a first predefined weight threshold and a second predefined weight threshold; and
indicating with one or more output devices:
when the weight is between the first predefined weight threshold and the second predefined weight threshold, the predefined user requires self-management to prevent congestive heart failure complications; and
when the weight is above the second predefined weight threshold, the predefined user requires medical assistance to prevent the congestive heart failure complications.

16. The method of claim 15, the one or more output devices comprising a plurality of sources presenting a first color indication when the predefined user requires the self-management to prevent the congestive heart failure complications and a second color indication when the predefined user requires the medical assistance to prevent the congestive heart failure complications.

17. The method of claim 16, further comprising:
measuring, with a pressure sensor, a contact area of the predefined user with the housing; and
causing one or more of the display or the one or more output devices to present an indication of edema when the contact area exceeds a predefined threshold.

18. The method of claim 16, further comprising delivering, with one or more audio output devices, instructions for one or more of accomplishing the self-management to prevent the congestive heart failure complications or obtaining the medical assistance to prevent the congestive heart failure complications.

19. The method of claim 16, further comprising recording, with the control circuit, the weight in a weight log and transmitting the weight log to another device.

20. A weight scale, comprising:
a housing defining a substantially planar surface;
a weight measurement device measuring a weight of a predefined user when on the substantially planar surface;
a display disposed along the substantially planar surface;

control circuit operable with the display, the control circuit storing in a memory a first predefined weight threshold of the predefined user and a second predefined weight threshold corresponding the predefined user; and a plurality of light sources, operable with the control circuit to selectively present one of three color-coded indications, wherein each of the plurality of light sources is separate from the display;

the control circuit further causing:

when the weight is below the first predefined weight threshold, at least one light source of the plurality of light sources to present a first color indication;

when the weight is between the first predefined weight threshold and the second predefined weight threshold, the at least one light source of the plurality of light sources to present a second color indication; and when the weight is above the second predefined weight threshold, the at least one light source of the plurality of light sources to present a third color indication;

further comprising a pressure sensor coupled to the housing and measuring a contact area of the predefined user with the substantially planar surface;

the control circuit causing the display to present an indication of edema when the contact area exceeds a predefined threshold.

21. A weight scale, comprising:

a housing defining a substantially planar surface;

a weight measurement device measuring a weight of a predefined user when on the substantially planar surface;

a display disposed along the substantially planar surface;

control circuit operable with the display, the control circuit storing in a memory a first predefined weight threshold of the predefined user and a second predefined weight threshold corresponding the predefined user; and a plurality of light sources, operable with the control circuit to selectively present one of three color-coded indications, wherein each of the plurality of light sources is separate from the display;

the control circuit further causing:

when the weight is below the first predefined weight threshold, at least one light source of the plurality of light sources to present a first color indication;

when the weight is between the first predefined weight threshold and the second predefined weight threshold, the at least one light source of the plurality of light sources to present a second color indication; and when the weight is above the second predefined weight threshold, the at least one light source of the plurality of light sources to present a third color indication;

at least one light source of the plurality of light sources comprising a touch sensitive user input device.

22. The weight scale of claim 21, the control circuit causing the display to present a prompt requesting food ingestion information on the display.

23. The weight scale of claim 22, the control circuit receiving the good ingestion information from the touch sensitive user input device in response to presentation of the prompt.

* * * * *